United States Patent
Kuwahara et al.

(10) Patent No.: US 6,804,216 B1
(45) Date of Patent: Oct. 12, 2004

(54) CODE DIVISION MULTIPLE ACCESS COMMUNICATION METHOD USING DYNAMIC CODE ASSIGNMENT, AND A BASE STATION PERFORMING THE METHOD

(75) Inventors: Mikio Kuwahara, Kokubunji (JP); Nobukazu Doi, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 816 days.

(21) Appl. No.: 09/595,896

(22) Filed: Jun. 20, 2000

(30) Foreign Application Priority Data

Jun. 23, 1999 (JP) ............................................. 11-176831

(51) Int. Cl.$^7$ .............................................. H04B 7/216
(52) U.S. Cl. .................... 370/335; 370/342; 455/562.1; 714/790
(58) Field of Search ................................. 370/328, 331, 370/335, 342, 329, 334, 341; 375/130, 150, 142; 714/790; 455/422, 440, 13.4, 513, 296, 436, 562.1

(56) References Cited

U.S. PATENT DOCUMENTS

| 5,673,260 | A | * | 9/1997 | Umeda et al. ............... 370/342 |
| 5,864,549 | A | * | 1/1999 | Honkasalo et al. ......... 370/335 |
| 6,011,787 | A | * | 1/2000 | Nakano et al. ............. 370/335 |
| 6,389,034 | B1 | * | 5/2002 | Guo et al. .................. 370/441 |
| 6,542,484 | B1 | * | 4/2003 | Ovesjö et al. .............. 370/335 |

OTHER PUBLICATIONS

Jiunn–Tsair Chen, et al., "Dynamic Signature Assignment for Reverse–Link CDMA Systems", ICC '99, 1999 IEEE International Conference on Communications, Conference Record, Vancouver, Canada, Jun. 6–10, 1999, IEEE International Conference on Communications, New York, NY, IEEE, US vol. 2, Jun. 6, 1999, pp. 912–916.

Kelvin K. Ho, "Architectural Design of a Code Division Multiple Access Cellular System", From Pioneers to the 21$^{st}$ Century, Denver, May 10–13, 1992, Proceedings of the Vehicular Technology Society Conference (VTSC), New York, IEEE, US, vol. 2, Conf. 42, May 10, 1992, pp. 47–50.

* cited by examiner

Primary Examiner—Duc Ho
(74) Attorney, Agent, or Firm—Antonelli, Terry, Stout & Kraus, LLP

(57) ABSTRACT

It is desired to carry out CDMA communication using an optimum spread code for minimizing inter-channel interference according to communication conditions. For this purpose, under condition that a communication area covered by a base station is variable, notification of spread code reassignment is issued while communication is being made between the base station and a mobile terminal. Thereafter, a currently assigned spread code is changed so as to reduce interference between a channel used for communication in progress and another channel. In spread code reassignment, an adjustment is made to provide the same long code for channels which would otherwise incur significant interference.

21 Claims, 6 Drawing Sheets

| A | C | D | E CHANGED CODE |

CODE DIVISION MULTIPLE ACCESS COMMUNICATION METHOD USING DYNAMIC CODE ASSIGNMENT, AND A BASE STATION PERFORMING THE METHOD

BACKGROUND OF THE INVENTION

1. Field of the Invention

The present invention relates to a code division multiple access communication method using dynamic code assignment. More particularly, the invention pertains to a code division multiple access communication method using dynamic code assignment in which a spectral spread code is dynamically changed to reduce possible interference during communication between a base station and a mobile terminal in an application such as cellular radio communication, and a base station facility for implementing the code division multiple access communication method using dynamic code assignment.

2. Description of the Related Art

In code division multiple access (CDMA) communication, an information signal band is spread out over a wider band for transmission using a code independent of information signals. Since the CDMA provides many advantages such as excellent security of privacy and secrecy of communication, high resistance to interference, adaptability to poor transmission path condition, asynchronous multiple accessibility based on code division, etc., it is expected to be employed extensively as a signaling scheme suitable for mobile communication, e.g., cellular telephone communication.

As a technique of CDMA communication, there is disclosed a DS-CDMA transmission system in Japanese Unexamined Patent Publication No. H10-145282, for example.

In mobile communication which is the principal application field of CDMA communication, it is common practice to divide a geographical control region into cells for implementing cellular communication. For making features of CDMA communication apparent, a multi-sector system which is one of mobile communication cell models will first be explained here.

Referring to FIG. 7, there is shown a schematic diagram for explaining the multi-sector system in cellular radio communication.

A control area called a cell is a geographical area in which communication is set up between a base station and a mobile terminal currently located in the coverage thereof. A multiplicity of cells are arranged in a service area so that each mobile terminal can communicate with at least one of base stations in the service area.

In FIG. 7, each area enclosed in a circle is a cell 42 which is covered by a base station 40.

By using a plurality of antennas each having directivity at the base station 40, the cell 42 is spatially divided into control sub-areas called sectors 41, one of which is shown as a fan-shaped section (hatched) in FIG. 7. Since a directional antenna is used for each of the sectors 41, it is possible to preclude external interference due to other sectors and increase the capacity of communication.

In the cell-sector scheme mentioned above, each mobile terminal such as a cellular telephone belongs to any cell-sector and a call termination service is provided to each mobile terminal upon receipt of a terminating call signal from a base station which covers the cell-sector scheme. In this situation, the mobile terminal periodically checks a common control signal issued by an adjacent base station to always attain base station conditions in the vicinity thereof. When a cell-sector changeover becomes necessary due to movement of the mobile terminal, the current position of the mobile terminal is re-registered in a relevant base station for carrying out a hand-over procedure (which is a link changeover procedure to be performed for switching to another control area).

Then, the following explains codes to be used for spectral spreading in CDMA communication.

In a CDMA system represented by the IS-95 or W-CDMA, the bitwise product or exclusive-OR result of long and short codes in synchronization is used for spread-spectrum coding for downlink transmission from a base station to a mobile terminal.

The functions of the long and short codes are as follows:

In short code assignment, an orthogonal code having a single-symbol cycle is used for identifying each of plural communication channels in a sector and for reducing possible interference between communication channels.

In long code assignment, a long-cycle code having a different phase or a different code sequence per sector or cell is used for identifying each sector or cell.

Table 1 presents a summary of the functional features of these two kinds of codes.

TABLE 1

|  | Long code | Short code |
| --- | --- | --- |
| Function | Identification of cell/sector | Identification of channel |
| Period | long | short |
| Code number in a period | many | few |
| Orthogonality | It does not always have | It has |
| Examples of IS-95, W-CDMA, etc. | PN code | Walsh code |

When correlation operation is performed on different short codes for the same long code, orthogonality is attained in coding. By way of contrast, when correlation operation is performed on different short codes for different long codes, orthogonality is not attained in coding. Orthogonalization in coding signifies that mutual interference does not occur in spread-spectrum communications, and non-orthogonalization in coding signifies that mutual interference may take place in spread-spectrum communications.

In CDMA communication, an improvement in its capacity can be made by reducing possible interference. As methods for significantly increasing the capacity of CDMA communication, advanced techniques such as an interference canceller technique and an adaptive array antenna technique have been suggested in publications. The introduction of these interference reduction techniques makes it possible to simultaneously connect more mobile terminals than ever before.

With reference to FIG. 8, a communication system using adaptive array antennas will then be briefly explained.

FIG. 8 is a block diagram of a base station in a communication system wherein adaptive array antennas are employed.

The base station is provided with a plurality of antennas. A signal received by the plural antennas is down-converted through an RF circuit 8 and then fed to a beam former 20, in which a weight value is added so that a signal-to-interference power ratio of the received signal will be maximized. The beam former 20 acts to provide a spatial filter.

More specifically, a main beam is oriented toward a desired user, and a null position of an antenna radiation is formed in the direction of a major interference potential. In this manner of operation, the adaptive array antenna can vary directivity thereof using electrical circuits without having to change physical positioning thereof. The weight-added composite signal is demodulated by a receiver 10 to provide user information.

In downlink transmission, an antenna beam can also be formed in the same manner. For a signal produced by a data generator 6, a beam adapted to the direction of each mobile terminal is formed according to uplink channel (propagation path) information. Thus, a signal is transmitted in a limited range of space. In the 1997 Conference Proceedings of the Institute of Electronics, Information and Communication Engineers B-5-88, for example, there is reported a method for estimating a weight value for downlink transmission according to a correlation matrix attained in uplink transmission. Through formation of a beam by this method, it is possible to substantially suppress interference power in downlink transmission. Therefore, the use of the adaptive array antenna having an advantageous capability of interference suppression allows a substantial increase in the number of simultaneous mobile terminal connections, making it possible to simultaneously connect more mobile terminals than those permissible at a spectral spread rate in a conventional arrangement.

The technique of adaptive array antennas is found in NTT DoCoMo Technical Journal Vol. 5—No. 4, p. 25, for example. Through the use of adaptive array antennas in cellular radio communication, the number of mobile terminals to be simultaneously connected with a base station can be increased in a cell covered by the base station.

As described above, in CDMA communication, an information signal spectrum is spread using a spread code to enable multiple access channel signaling. That is, channels (propagation paths) are separated using different codes for multiple access implementation in CDMA communication.

In other words, the above-stated principle of CDMA communication signifies that the number of usable codes represents the upper limit of multiplexing. In a system such as the IS-95 or W-CDMA, long and short codes are employed and orthogonality of short codes is applied for reduction in inter-channel interference in downlink transmission in particular. Although orthogonalization using short codes is very advantageous for reduction in co-channel interference, there is a problem that the allowable number of orthogonal codes is limited in terms of a short code length. Hence, there may occur a condition that the number of orthogonal short codes becomes insufficient.

As a conventional technique for circumventing this problem, it has been proposed to provide a method of identifying channels by using different-phase long codes for respective mobile terminals. In this method, however, significant interference may occur between channels having different codes, giving rise to a problem of intra-sector interference which would otherwise be non-existent.

As mentioned above, if the number of orthogonal short codes becomes insufficient, it is inevitable to use different long codes. However, since orthogonality is not always attained between different long codes in most cases, inter-channel interference may increase to cause degradation in communication quality.

In the above-cited Japanese Unexamined Patent Publication No. H10-145282, though there is disclosed a technique of selecting an optimum one of some kinds of spread codes according to a transmission speed, no inventive concept is found concerning a method for reducing interference due to insufficiency in the number of spread codes.

On the other hand, in a system using the adaptive array antennas described in the foregoing, a plurality of antennas are used to form each beam for providing RF power toward a desired mobile terminal for communication. Therefore, although interference does not occur among certain mobile terminals in a cell, some mobile terminals spatially located near a base station are likely to be affected by interference. The above-mentioned problem of an increase in interference due to insufficiency in the number of orthogonal codes may be alleviated in terms of probability based on spatial selectivity of the adaptive array antennas.

Nevertheless, since a radio communication system to which the present invention is directed is a mobile communication system, there arises an inherent problem due to time-varying mobility of each terminal. Therefore, even if an optimum code is assigned at the time of link setup, the amount of mutual interference may timewise vary or a source of interference may be changed with time, resulting in degradation in communication quality after a lapse of time. That is, for a mobile terminal, there is a latent problem that an optimum code varies depending on a timewise change in communication conditions.

In a system using sector antennas each having a narrow beam width (having directivity per sector), a mobile terminal frequently undergoes a hand-over procedure for sector-to-sector switching, i.e., it is required to carry out the hand-over procedure through a network for each sector-to-sector switching. This condition implies that not only a mobile terminal being in communication but also a mobile terminal being in a standby state for call reception needs to perform re-registration, thereby posing a problem that a charge-to-charge service life of a battery contained in each mobile terminal is shortened.

SUMMARY OF THE INVENTION

It is therefore an object of the present invention to obviate the above-mentioned disadvantages by providing a code division multiple access communication method using dynamic code assignment, wherein an optimum spread code for minimizing inter-channel interference is used according to conditions of communication between a base station and a mobile terminal, and wherein code assignment is dynamically changed for a mobile terminal being in communication through detection of a timing point of code change under initiative control of the base station.

It is another object of the present invention to provide a code division multiple access communication method using dynamic code assignment, wherein code assignment is dynamically changed to reduce inter-channel interference according to conditions such as space correlation and code correlation due to characteristics of adaptive array antennas or sector antennas employed for communication.

It is a further object of the present invention to provide a code division multiple access communication method using dynamic code assignment, wherein a hand-over procedure is carried out under initiative control of a base station for reducing power consumption of a mobile terminal so as to prolong a charge-to-charge service life of a battery contained therein.

It is an additional object of the present invention to provide a mobile communication system comprising a base station control unit connected with a base station, wherein code assignment is dynamically changed without making reference to a network for reducing a networking load in communication between the base station and the base station control unit.

In accomplishing these objects of the present invention and according to one aspect thereof, there is provided a code division multiple access communication method using dynamic code assignment in radio communication based on code division multiple access between a base station and a mobile terminal, comprising: providing an arrangement wherein, under condition that a communication area covered by the base station is variable, while communication is being carried out between the base station and the mobile terminal, a transmitting side notifies a receiving side that a spread code is to be changed, and after notification of spread code reassignment, the spread code is changed so as to reduce interference between a channel used for communication in progress and another channel.

More specifically, according to another aspect of the present invention, there is provided a code division multiple access communication method using dynamic code assignment, wherein, at the time of notification of spread code reassignment from the transmitting side to the receiving side, the transmitting side also informs the receiving side of a timing point of spread code reassignment.

Furthermore, according to another aspect of the present invention, there is provided a code division multiple access communication method using dynamic code assignment, wherein, at the time of spread code reassignment, a transmission signal spread using a currently assigned code and a transmission signal spread using a new code to be assigned are sent simultaneously, and then when the transmitting side receives an acknowledgment that the receiving side has received the transmission signal spread using the new code to be assigned, the transmitting side stops output of the transmission signal spread using the currently assigned code and sends only the transmission signal spread using the new code.

Further, according to another aspect of the present invention, there is provided a code division multiple access communication method using dynamic code assignment, wherein a spread code is formed of the bitwise product or exclusive-OR result of long and short codes, and wherein the transmitting side changes the spread code when the number of short codes to be used for spread coding becomes insufficient.

Still further, according to another aspect of the present invention, there is provided a code division multiple access communication method using dynamic code assignment, wherein, at the transmitting side, a space correlation of a plurality of receiving-side channels and a code correlation of a plurality of spread codes used for communication are calculated, each time-space correlation is determined according to the product of space and code correlations, each sum of time-space correlations is calculated with respect to all the inter-channel combinations, a candidate for a new spread code to be assigned is determined according to a minimum-sum time-space correlation, and a procedure for spread code reassignment is carried out to perform communication based on the new spread code.

Still further, according to another aspect of the present invention, there is provided a code division multiple access communication method using dynamic code assignment, wherein, at the transmitting side, an interference power level per call is measured, and when the measured interference power level per call exceeds a predetermined threshold, a procedure for spread code reassignment is carried out to change a spread code for a channel corresponding to each call of interest.

Still further from a different viewpoint, according to another aspect of the present invention, there is provided a code division multiple access communication method using dynamic code assignment, wherein a base station acts as a transmitting side and a base station control unit is connected with the base station, and wherein, in execution of a procedure for spread code reassignment, a transmission signal is subjected to puncturing at the base station, and information on spread code reassignment is inserted into a free bit space thus produced for transmission to a receiving side.

Still further, according to another aspect of the present invention, there is provided a code division multiple access communication method using dynamic code assignment, wherein a receiving side has a common control channel used for identifying a transmitting side and an individual channel dedicated for the receiving side, and wherein the transmitting side radiates a beam for the common control channel in a wider space range than for the individual channel.

In accomplishing the above-mentioned objects of the present invention and according another aspect thereof, there is provided a base station for code division multiple access communication using dynamic code assignment in radio communication between the base station and a mobile terminal under condition that a communication area covered by the base station is variable, comprising: means for notifying a receiving side that a spread code is to be changed while communication is being carried out between the base station and the mobile terminal; and means for changing the spread code after notification of spread code reassignment so as to reduce interference between a channel used for communication in progress and another channel.

More specifically, according to another aspect of the present invention, there is provided a base station for code division multiple access communication using dynamic code assignment, wherein means for informing the receiving side of a timing point of spread code reassignment is included in addition to the means for notifying the receiving side that the spread code is to be changed.

Furthermore, according to another aspect of the present invention, there is provided a base station for code division multiple access communication using dynamic code assignment, further comprising: means for simultaneously sending a transmission signal spread using a currently assigned code and a transmission signal spread using a new code to be assigned at the time of spread code reassignment; and means for, upon receipt of an acknowledgment that the receiving side has received the transmission signal spread using the new code to be assigned, stopping output of the transmission signal spread using the currently assigned code and for sending only the transmission signal spread using the new code.

Still further, according to another aspect of the present invention, there is provided a base station for code division multiple access communication using dynamic code assignment, wherein a spread code is formed of the bitwise product or exclusive-OR result of long and short codes, and wherein there is provided means for changing the spread code when the number of short codes to be used for spread coding becomes insufficient.

Still further, according to another aspect of the present invention, there is provided a base station for code division multiple access communication using dynamic code assignment, further comprising: means for calculating a space correlation of a plurality of receiving-side channels and a code correlation of a plurality of spread codes used for communication; means for determining each time-space correlation according to the product of space and code correlations; and means for performing summation on time-space correlations with respect to all the inter-channel combinations; wherein a candidate for a new spread code to be assigned is determined according to a minimum-sum time-space correlation, and a procedure for spread code reassignment is carried out to perform communication based on the new spread code.

Still further, according to another aspect of the present invention, there is provided a base station for code division multiple access communication using dynamic code assignment, further comprising: means for measuring an interference power level per call, wherein, when the measured interference power level per call exceeds a predetermined threshold, a procedure for spread code reassignment is carried out to change a spread code for a channel corresponding to each call of interest.

Still further from a different viewpoint, according to another aspect of the present invention, there is provided a base station for code division multiple access communication using dynamic code assignment, wherein a base station control unit is connected with the base station, and wherein, in execution of a procedure for spread code reassignment, a transmission signal received by the base station from the base station control unit is subjected to puncturing at the base station, and information on spread code reassignment is inserted into a free bit space thus produced for transmission to a receiving side.

Still further, according to another aspect of the present invention, there is provided a base station for code division multiple access communication using dynamic code assignment, wherein a receiving side has a common control channel used for identifying a transmitting side and an individual channel dedicated for the receiving side, and wherein the base station radiates a beam for the common control channel in a wider space range than for the individual channel.

In accomplishing the above-mentioned objects of the present invention and according to another aspect thereof, there is provided a base station for code division multiple access communication using dynamic code assignment, wherein a spread code is formed of the bitwise product or exclusive-OR result of long and short codes, wherein there is provided means for detecting a bearing of each mobile terminal according to average received signal intensity, and wherein the mobile terminal is notified of spread code reassignment using the means for notification of spread code reassignment, and then a spread code for communication is changed in a fashion that long codes of a mobile terminal group located in the vicinity of the detected bearing are made identical.

More specifically, according to another aspect of the present invention, there is provided a code division multiple access communication method using dynamic code assignment, wherein the transmitting side is provided with a plurality of directional antennas capable of radiating radio waves in a limited direction, wherein a region covered by each directional antenna is defined as a physical subsector, a plurality of adjacent physical subsectors are grouped into a wider region in which the same long code is used for communication with communicating parties therein, and the wider region thus formed is defined as a logical subsector, and wherein, at the time of signal reception from each communicating party, under condition that a timewise average value of received signal intensity in an adjacent logical subsector becomes higher than that in a logical subsector currently engaged for communication with the communicating party; or under condition that, at the transmitting side, a space correlation of a plurality of receiving-side channels and a code correlation of a plurality of spread codes used for communication are calculated, each time-space correlation is determined according to the product of space and code correlations, and a value of time-space correlation attained using a long code for an adjacent logical subsector is found to be smaller than that attained using a long code for a logical subsector currently engaged for communication; a procedure for spread code reassignment is carried out to perform communication based on the long code for the logical subsector adjacent to the logical subsector currently engaged for communication.

Still further, according to another aspect of the present invention, there is provided a code division multiple access communication method using dynamic code assignment, wherein the transmitting side is provided with a plurality of directional antennas capable of radiating radio waves in a limited direction, wherein a region covered by each directional antenna is defined as a physical subsector, a plurality of adjacent physical subsectors are grouped into a wider region in which the same long code is used for communication with communicating parties therein, and the wider region thus formed is defined as a logical subsector, and wherein, in a situation that the number of short codes becomes insufficient due to an increase in communication traffic in a logical subsector A, a procedure for spread code reassignment is carried out to change a spread code in the following fashion:

(1) if there are short codes available for assignment in a logical subsector B adjacent to the logical subsector A, a physical subsector P which belongs to the logical subsector A and which is positioned on a boundary between the logical subsector A and the logical subsector B is rearranged so that the physical subsector P belongs to the logical subsector B, whereby a long code of the logical subsector B is used for communication with a communicating party in the physical subsector P;

(2) alternatively, if there are no short codes available for assignment in the logical subsector B adjacent to the logical subsector A, a new logical subsector C is formed for the physical subsector P which belongs to the logical subsector A and which is positioned on the boundary between the logical subsector A and the logical subsector B, whereby a long code of the logical subsector C is used for communication with a communicating party in the physical subsector P.

Still further, according to another aspect of the present invention, there is provided a code division multiple access communication method using dynamic code assignment, wherein the transmitting side is provided with a plurality of adaptive array antennas, and wherein, under either of the following conditions (1) and (2), the inner product of array weight values is calculated with respect to each communicating party, and a procedure for spread code reassignment is carried out to change a spread code so that the same long code is used for communication with a group of mobile terminals having a high value of inner product:

(1) at the transmitting side, a space correlation of a plurality of receiving-side channels and a code correlation of a plurality of spread codes used for communication are calculated, each time-space correlation is determined according to the product of space and code correlations, each sum of time-space correlations is calculated with respect to all the inter-channel combinations, and a candidate for a new spread code to be assigned is determined according to a minimum-sum time-space correlation for spread code reassignment to perform communication based on the new spread code;

(2) at the transmitting side, an interference power level per call is measured, and when the measured interference level per call exceeds a predetermined threshold, a spread code for a channel corresponding to each call of interest is changed for spread code reassignment.

Still further, according to another aspect of the present invention, there is provided a code division multiple access communication method using dynamic code assignment, wherein a space correlation of a channel used for communication with a mobile terminal A and channels used for communication with other mobile terminals is determined, wherein, with respect to a high-order range "n" in terms of space correlation values arranged in descending order (where "n" is a predetermined positive integer), comparison is made between a long code in spread coding for the channel used for communication with the mobile terminal A and long codes in spread coding for channels corresponding to the high-order range "n", and wherein a procedure for spread code reassignment is carried out to change a spread code in a fashion that long codes used for communication with other mobile terminals corresponding to the high-order range "n" are made identical to the long code used for communication with the mobile terminal A if a mismatch is found therebetween.

In accomplishing the above-mentioned objects of the present invention and according to another aspect thereof, there is provided a base station for code division multiple access communication using dynamic code assignment in radio communication between the base station and a mobile terminal, wherein a base station control unit is connected with the base station, and wherein, at the time of transmission of control information to the mobile terminal, a transmission signal received by the base station from the base station control unit is subjected to puncturing at the base station, and control information is inserted into a free bit space thus produced for transmission to the mobile terminal.

Furthermore, according to another aspect of the present invention, there is provided a mobile terminal for code division multiple access communication using dynamic code assignment in radio communication between a base station and the mobile terminal, wherein the mobile terminal is so arranged as to take control information out of a punctured signal received from the base station.

The above and other objects, features and advantages of the present invention will become more apparent from the following detailed description with reference to the accompanying drawings.

DETAILED DESCRIPTION OF THE PREFERRED EMBODIMENTS

The present invention will now be described in detail by way of example with reference to FIGS. 1 to 6.

Embodiment 1

Figure 1:
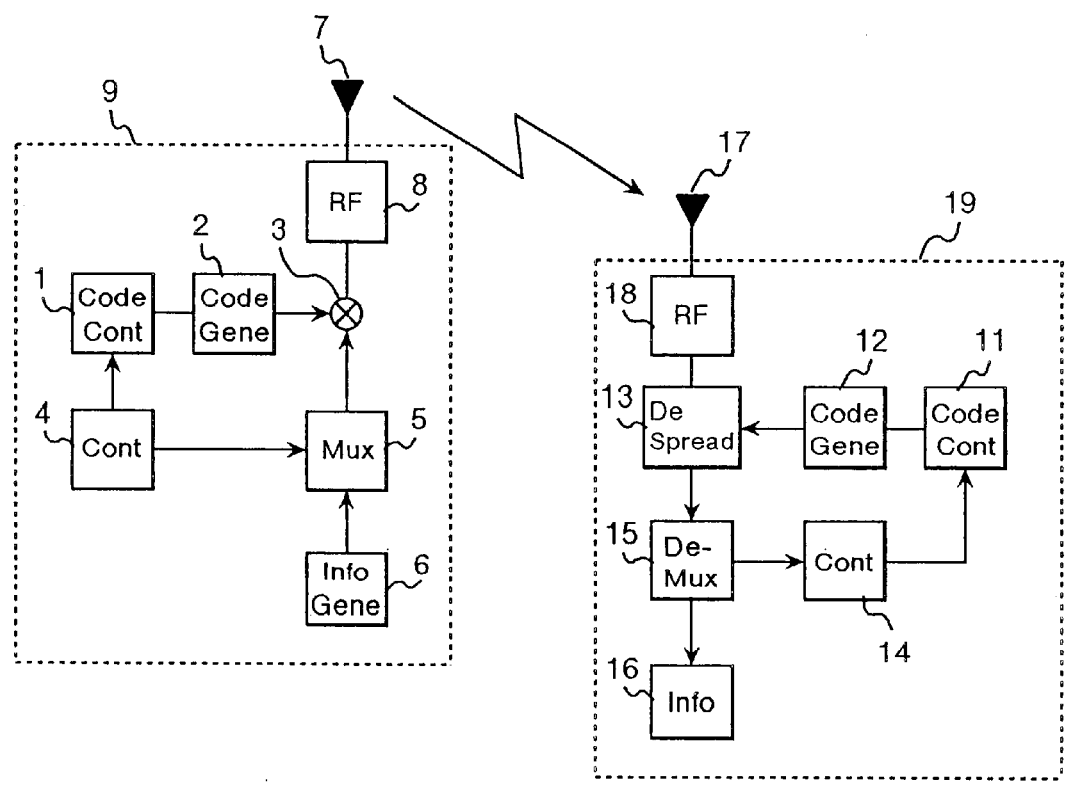
FIG. 1 is a block diagram showing a communication system configuration in a first preferred embodiment of the present invention.

The following describes a first preferred embodiment of the present invention with particular reference to FIG. 1.
(I) Configuration and Operations of Communication System in Embodiment 1

The configuration and operations of the communication system in the first preferred embodiment of the present invention are explained below with reference to FIG. 1.

FIG. 1 is a block diagram showing the communication system configuration in the first preferred embodiment of the present invention.

In this embodiment, radio communication from a transmitter 9 to a receiver 19 is carried out, i.e., in downlink transmission, radio waves are sent from the transmitter 9 in a base station to a receiver 19 in a mobile terminal.

A signal sent from the transmitter 9 is received by the receiver 19. In this example, the transmitter 9 has a single antenna 7 and the receiver 19 has a single antenna 17 for the sake of simplicity in explanation. In a system having a plurality of antennas, the same advantageous effects of the present invention can also be provided.

A signal produced by a data generator 6 is fed to a multiplexer 5, in which control information is added to the signal. Then, the signal is applied to a spreading circuit 3, in which the signal is multiplied by an arbitrary spread code. Thereafter, the signal is up-converted through an RF circuit 8, and transmitted from the antenna 7.

A code generator 2 serves to determine and generate a spread code under direction of a code controller 1. The code controller 1 manages coding as instructed by a transmitter controller 4, and during communication, a spread code can be changed by giving an instruction from the transmitter controller 4 to the code controller 1. The principal purpose of the present invention is to provide a means which is capable of performing spread code reassignment during CDMA communication.

In spread code reassignment, a code for despreading must be changed on a receiving side also. It is therefore required for the transmitter 9 to notify the receiver 19 of spread code reassignment. For this notification, a control signal is generated by the transmitter controller 4, and the control signal thus generated is added to a transmission signal in the multiplexer 5. In this manner, the control signal for notification of spread code reassignment is sent to the receiver 19.

In the receiver 19, a signal received by the antenna 17 is fed to an RF circuit 18, in which the received signal is down-converted for demodulation to a baseband signal. Then, at a despreading circuit 13, the signal is despread according to the same spread code as that used in the transmitter 9. Thus, through despreading, demodulation is performed to attain the original signal. Then, at a demultiplexer 15, control information is removed from the signal thus demodulated, so that user information can be attained. The control information taken out by the demultiplexer 15 is then analyzed by a receiver controller 14 for carrying out necessary processing.

In case that the control information taken out by the demultiplexer 15 indicates notification of spread code reassignment, the receiver controller 14 informs a code controller 11 that a spread code is to be changed. Then, under direction of the code controller 11, a code generator 12 is controlled to change a spread code for despreading in the despreading circuit 13.

In a procedure of steps such as mentioned above, the present invention makes it possible to dynamically change a spread code during CDMA communication. That is, the basic concept of the present invention is to reduce inter-channel interference by changing a spread code in such a situation that interference with another channel increases at a mobile terminal being in communication.

(II) Principle of Spread Code Reassignment

In (I), there has been described a procedure for making notification of spread code reassignment from the transmitter 9 to the receiver 19. Furthermore, the transmitter controller 1 can inform the transmitter 19 of a timing point of spread code reassignment additionally. The receiver 19 operates in synchronization with the transmitter 9, and code timing and frequency deviation in a baseband are corrected during communication. Therefore, knowing a timing point of spread code reassignment, the receiver 19 can change a spread code immediately in a seamless fashion. This procedure is functionally equivalent to a conventional hand-over procedure. If the transmitter 9 lets the receiver 19 know a timing point of spread code reassignment, it is not required to provide a soft hand-over state in which communication is performed using both changed and unchanged codes, however. Therefore, resources of the receiver in a mobile terminal can be used efficiently, making it possible to carry out communication with higher efficiency. A timing point of spread code reassignment can be indicated using the relative number of frames or the relative number of slots with respect to a frame used for notification of spread code reassignment. Thus, the receiver 19 can change a spread code without regard to a propagation delay.

In addition to notification of spread code reassignment, the receiver 19 is informed of a timing point of spread code reassignment as mentioned above, thereby enabling immediate changeover of a spread code during communication.

As in the conventional hand-over procedure, there may be provided such an arrangement that both the current (unchanged) and new (changed) codes are transmitted once. In this arrangement, upon checking receipt of a new code, the receiver 19 returns the transmitter 9 an acknowledgment that the new code has been received successfully. Then, after receiving this acknowledgment, the transmitter 9 stops transmission using the current code. In this manner, spread code reassignment can be accomplished smoothly.

(III) Triggers of Spread Code Reassignment

In CDMA communication according to the present invention, there are two possible triggers of spread code reassignment. A first trigger of spread code reassignment is a condition that the number of short codes becomes insufficient due to occurrence of a new call, and a second trigger thereof is a condition that each of a code correlation and a propagation path correlation deviates from an optimum state due to a change in signal propagation caused by movement of a mobile terminal.

In either case, it is desirable to reassign an optimum spread code. Exemplified below is a situation where the number of short codes becomes insufficient due to occurrence of a new call. In this example, assume that a spreading ratio is 128 and all the short codes have the same length (single transmission speed) for the sake of simplicity. In this situation, there are 128 orthogonal short codes. Therefore, if the number of mobile terminals being connected exceeds 128, no spread codes having the same long code become available, i.e., it becomes necessary to use different long codes. For spread code generation, if a new long code is used, there may occur a problem of intense interference due to difference in long code assignment. To prevent such a problem, an optimum spread code must be used for reducing interference.

(IV) Determination of Spread Code

Then, the following describes how to determine a spread code for minimizing interference.

Generally in CDMA communication, factors of determining radio interference are a space correlation and a code correlation of communication channels (propagation paths). Hence, for reduction in interference, a check is made to find out such a combination of codes that the product of a space correlation and a code correlation of communication channels (propagation paths) is minimized. Then, according to the result of this check, spread code reassignment is carried out. Base on this principle of coding, co-channel interference can always be minimized even in the first case in (III) mentioned above that the number of mobile terminals being connected exceeds the number of orthogonal short codes.

Taking a sector antenna (an antenna having directivity for each sector) as an example, the following concretely describes how to determine a spread code. It is herein assumed that the directivity of the sector antenna is invariable.

A space correlation of transmission channels at the sector antenna is given by expression 1 shown below.

$$=R_{kl}^S = \int_0^{2\pi} G_k(\theta) G_l(\theta) d\theta \qquad \text{[Expression 1]}$$

where, $G_k(\theta)$ indicates a directivity pattern of the 'k'th sector antenna. Expression 1 represents a space correlation of channels of the 'k'th and 'l'th sector antennas.

In general, radio communication is performed over a transmission channel (propagation path) subjected to individual fading. A relationship of channels can be recognized by examining a space correlation of channels. When a degree of space correlation of channels is high, it signifies that mutual interference is likely to occur.

In a multi-sector system for CDMA communication, it is common practice to assign different long codes to respective sectors. It is therefore predictable that intense interference may occur on a boundary region of sectors.

A time correlation of the 'k'th and 'l'th channels is given by expression 2 shown below.

$$R_{kl}^T = \sum_{n=1}^{N} \frac{c_k(n) c_l(n)}{N} \qquad \text{[Expression 2]}$$

where, $C_k(i)$ indicates a spread code for the 'k'th channel in a period of time "i".

For examining both the space correlation and time correlation in combination, multiplication of expressions 1 and 2 is performed. Thus, a time-space correlation can be attained. As a degree of time-space correlation decreases, a degree of mutual involvement of channels becomes lower, signifying that interference is less likely to occur.

Therefore, for channels having a high degree of space correlation for example, spread codes using the same long code which are low in terms of code correlation are assigned. Thus, a degree of time-space correlation can be minimized.

An overall time-space correlation in an entire cell is given by expression 3 shown below.

$$R = \sum_{k,l} R_{kl}^S \cdot R_{kl}^T \qquad \text{[Expression 3]}$$

where the suffix of Σ means that summation is performed for all the sectors belonging to a cell of interest. With respect to the entire cell, a check is made to find out a combination of spread codes which minimizes the overall time-space correlation given by expression 3. Thus, an optimum combination of spread codes can be determined so as to minimize interference.

While the sector antenna having invariable directivity has been taken as an example in the above description, the same principle is also applicable to a case where an adaptive array antenna having variable directivity is employed.

In a situation where the adaptive array antenna is provided, expression 4 shown below is used for calculation of a space correlation.

$$R_{kl}^S = W_k^H W_l \qquad \text{[Expression 4]}$$

where $W_k$ indicates a weight value of the 'k'th adaptive array antenna. That is, $W_k$ is a vector for "m" antennas, and the suffix H indicates a Hamiltonian conjugate and transposed operator for complex numbers matrix.

In the use of the adaptive array antenna, multiplication of a space correlation calculated using expression 4 and a code correlation calculated using expression 2 is performed to attain a time-space correlation. Through evaluation of the time-space correlation thus attained, it is possible to find out a combination of spread codes which minimizes interference.

In the above example, only one path is considered with respect to a weight value of the adaptive array antenna. By way of contrast, in an adaptive array antenna system where an individual array weight value is provided for each path on occurrence of multipath propagation, summation averaging of array weight values of respective paths is performed for estimation of average arrival bearing information. In this case, it is necessary to perform addition after making rotation so that a weight phase of any reference antenna becomes 0 or a real value. Alternatively, in a system where an weight value is estimated using signal sub-space, it is also practicable to estimate an array weight value for correlation evaluation after adding signal sub-space values for respective paths. The array weight value thus estimated includes information on all the paths, i.e., it represents signal arrival bearing information having maximum likelihood.

In implementation of the algorithm mentioned above, it is required to carry out correlation calculation constantly in mobile communication in which transmission channels (propagation paths) vary at all times. This signifies that a rather heavy load of computation is imposed on a base station. It is therefore preferable to provide an arrangement wherein the base station is equipped with individual means for interference power measurement per channel and wherein correlation calculation is performed only when a measured interference power level per channel exceeds a predetermined threshold, thereby achieving reduction in the amount of calculation in the base station. Interference power measurement may be carried out by measuring a power level of a signal subjected to despreading with an unused spread code or by using variance attained in the result of propagation path estimation.

In a CDMA system in which transmission power control is conducted, a signal-to-interference ratio is measured for power control. Since an interference power level can be measured using the signal-to-interference ratio, additional provision of any special circuit is not required for implementation of interference power measurement.

Thus, a load of computation in the base station can be decreased by reducing the amount of correlation calculation as described above.

Embodiment 2

Figure 2:
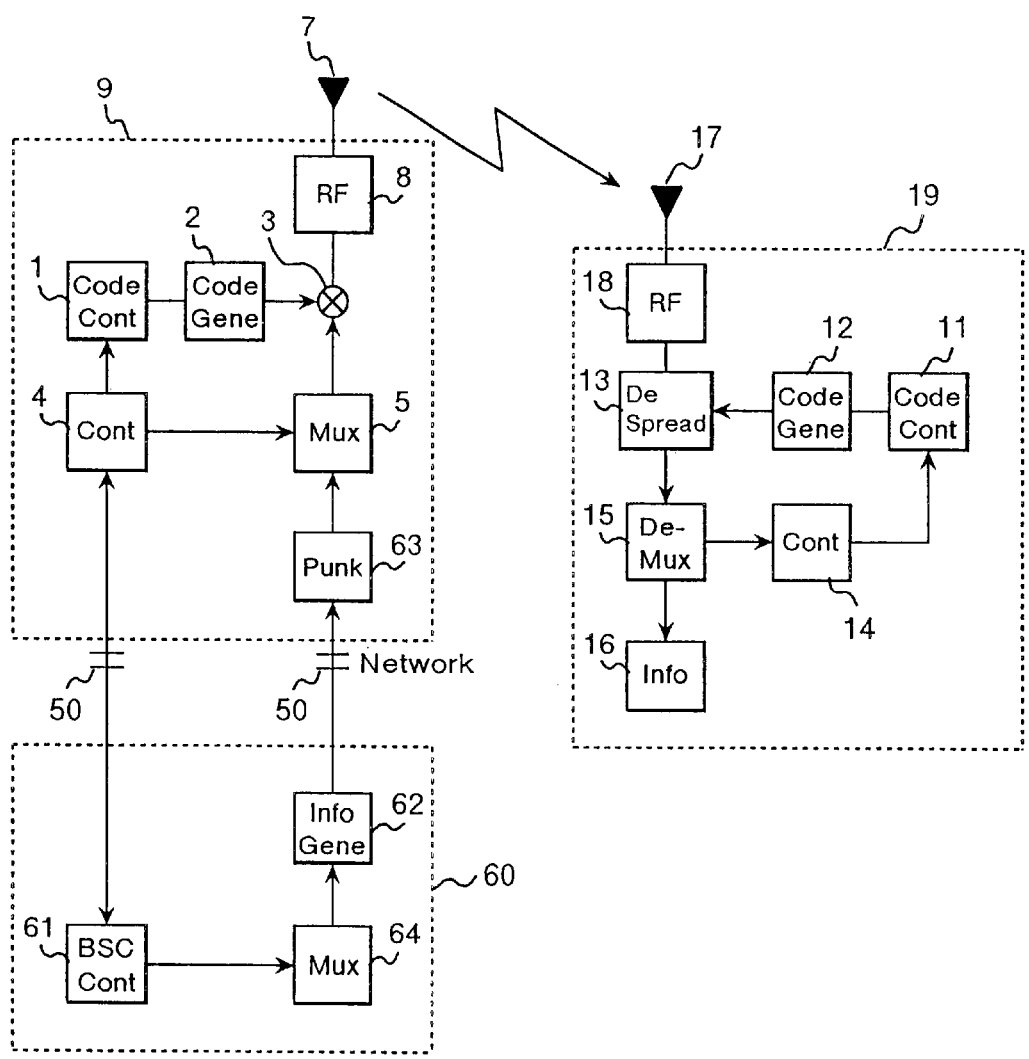
FIG. 2 is a block diagram showing a communication system configuration in a second preferred embodiment of the present invention.
Figure 3A:
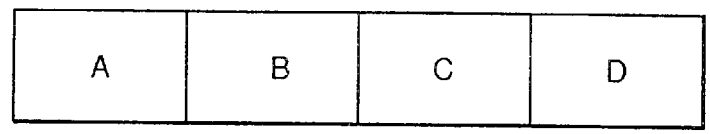
FIG. 3 is a diagrammatic illustration for explanation a data structure in code puncturing.
Figure 3B:
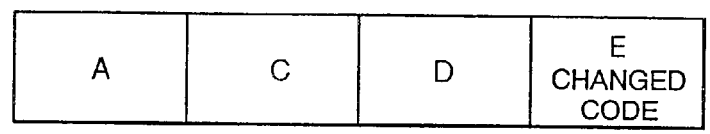

The following describes a second preferred embodiment of the present invention with particular reference to FIGS. 2 and 3.

FIG. 2 is a block diagram showing a communication system configuration in the second preferred embodiment of the present invention, and FIG. 3 is a diagrammatic illustration for explanation of a data structure in code puncturing.

In the first preferred embodiment described in the foregoing, a control signal is multiplexed by the multiplexer 5 in the transmitter 9 before transmission to the receiver 19. In the communication system configuration according to the second preferred embodiment, it is assumed that a base station control unit 60 is connected with the transmitter 9 through a network 50. In this communication system configuration, a control signal is generated in the base station control unit 60 and then fed to the transmitter 9 of each base station.

Incidentally, in the above-mentioned system configuration, control information is managed by the base station control unit 60, not by each base station. Therefore, in a case where spread code reassignment is carried out during communication on the same principle as that in the first preferred embodiment, the base station detects inter-channel interference and then sends the base station control unit 60 such information on transmission channels (propagation paths) and code correlation as mentioned above. Thereafter, it is required for the base station control unit 60 to issue control information concerning spread code reassignment. In this scheme, however, a load on the network 50 between the base station control unit 60 and the transmitter 9 of the base station is increased to cause inefficiency in system performance.

To circumvent this in the second preferred embodiment, the transmitter 9 of the base station forms a determination on spread code changeover and a processing procedure for spread code changeover is carried out by the transmitter 9 alone. Thus, a load on the network 50 between the base station control unit 60 and the transmitter 9 of the base station can be reduced, and a load on the base station control unit 60 can be alleviated through distributed processing.

More specifically, in the transmitter 9, control information generated by the base station control unit 60 is subjected to puncturing using a bit puncture circuit 63. The term "puncturing" means that the contents of normal data are altered intentionally to insert any other information thereinto. The multiplexer 5 inserts spread code reassignment notification and spread code information into a free bit space produced by puncturing. For example, in FIG. 3, assume that data (a) is normal data and the second block B is removable. In this case, as shown in (b), the block B is removed and a spread code E is added to the last position of the data. This technique is generally applicable to radio communication in which channel coding such as convolutional coding or turbo coding is performed at a coding rate of 1 or less and therefore transmission data bit puncturing to some extent scarcely affects communication performance.

General control information other than that concerning spread code reassignment, e.g., cell-to-cell hand-over control signal information, is generated by a BSC controller 61 of the base station control unit 60 and then inserted into a transmission signal by a multiplexer 64 thereof in principle.

In the receiver 19, notification of spread code reassignment is recognized as described below. Code error calculation is performed on the first three blocks of data. To be more specific, code error calculation is made on the assumption that data is transmitted in a sequence of blocks "A-C-D". If the result of code error calculation is extremely near zero, it is recognized that the data has been subjected to bit puncturing for spread code reassignment. In case that normal data having a sequence of blocks "A-B-C" is transmitted, code error calculation based on the assumption of the sequence of blocks "A-C-D" will result in an increased code error rate.

The above-mentioned technique of bit puncturing at the base station is advantageous in that there is no need to give special information to the base station control unit 60. Therefore, this bit puncturing technique is applicable not only to spread code reassignment processing but also to a variety of cases where information generated by the base station is to be given to the receiver 19.

Embodiment 3

Figure 4A:
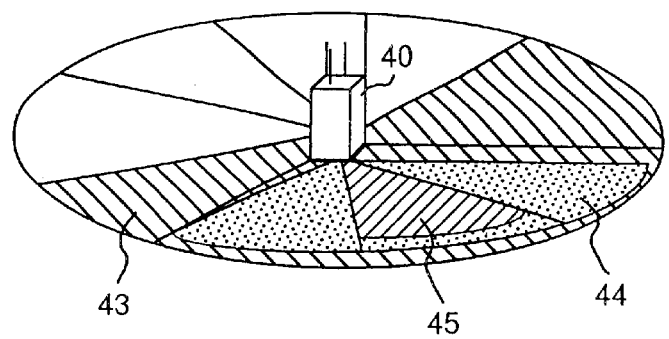
FIG. 4 is a diagrammatic illustration for explanation of a concept of sectors in a third preferred embodiment of the present invention.
Figure 4B:
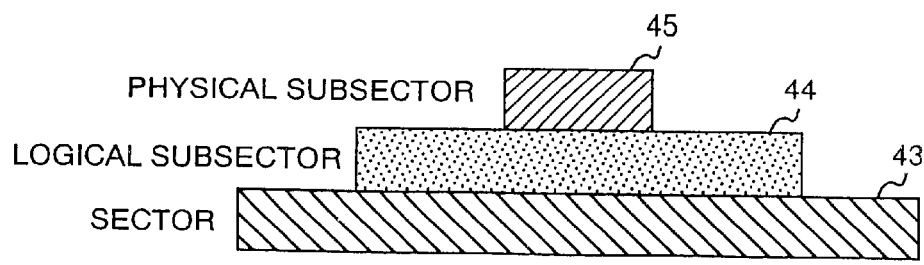

The following describes a third preferred embodiment of the present invention with particular reference to FIGS. 4 and 5.

FIG. 4 is a diagrammatic illustration for explanation of a concept of sectors in the third preferred embodiment of the present invention, and FIG. 5 is a diagrammatic illustration for explanation of code assignment for logical subsectors.

The third preferred embodiment is presented for showing how spread code reassignment during communication described in the first preferred embodiment is to be implemented in a concrete model of communication using sectors.

First, described below is an example of a sector antenna system in which interference is reduced using sector antennas each having directivity per sector.

As explained in the foregoing, in a multi-sector system, each cell is divided into a plurality of sectors with a base station located at the center position of the cell. When a sector changeover is made as movement of a mobile terminal, it is required to carry out a hand-over procedure. In particular, where each sector region is rather narrow, a hand-over must be made frequently for sector-to-sector switching. A hand-over is required not only when the mobile terminal is in communication but also when the mobile terminal is in a standby state for call reception. That is, it is required for the mobile terminal to frequently register the current location thereof, giving rise to a problem that a charge-to-charge service life of a battery contained in the mobile terminal is shortened.

The principle of the third preferred embodiment is that sectors defined by physical directivity characteristics of sector antennas are logically rearranged for spread code reassignment, thereby reducing hand-over processing due to frequent sector-to-sector switching of each mobile terminal.

In the third preferred embodiment based on this principle, a novel concept of sector structuring is introduced into a conventional sector configuration. As shown in FIG. 4, each sector 43 is hierarchically structured to contain a logical subsector 44 and a physical subsector 45.

Each physical subsector 45 is formed according to the physical radio wave directivity of each sector antenna. The physical subsector 45 represents a sector area in view of coverage of the sector antenna.

Further, an area where the same long code is used for individual channels is defined as a logical subsector 44. Channels in a cell are briefly explained here. There are common control channels and individual channels. The common control channels are used to perform common control of mobile terminals from each base station (e.g., pilot channel, sync channel in IS-95 downlink transmission), and the individual channels are dedicated to respective mobile terminals (e.g., traffic channel in IS-95 downlink transmission). The logical subsector 44 is an area logically delineated in view of long code assignment in spread coding used for communication between the base station and mobile terminals. The logical subsector 44 comprises one or more physical subsectors 45.

Still further, an area where the same spread code is used for common control channels is defined as a sector 43. Since control operations common to mobile terminals are performed through the common control channels, there will occur no problem of insufficiency of the number of short codes used for respective terminals. Therefore, unlike the case of individual channels, the same spread code is applicable to a wide area. In the light of the above condition, the sector 43 is defined as the widest sector in the third preferred embodiment. The sector 43 comprises one or more logical subsectors 44.

In the hierarchical sector structure mentioned above, communication from the base station to each mobile terminal is performed using a spread code corresponding to the area concerned. For the common control channels, it is not required to carry out a hand-over unless the sector 43 is switched over to another sector. Since the sector 43 is commonly a wide area containing a plurality of logical subsectors 44, a hand-over does not occur at frequent intervals. That is, as to the common control channels, a plurality of conventional sectors are recognized as a single sector from a viewpoint of each mobile terminal.

In regard to the individual channels, a spread code having the same long code is used for communication with mobile terminals belonging to the same logical sector 44 even if they belong to different physical subsectors 45 defined by antenna directivity characteristics. Therefore, interference on a boundary of the physical subsectors 45 can be eliminated at the time of changeover of the physical subsectors 45, which would otherwise occur as in a conventional sector model.

In the prior art of CDMA communication, a hand-over procedure is implemented under initiative control of each mobile terminal, i.e., a procedure for hand-over processing is carried out through comparison of field intensity levels of common control channels. Therefore, a hand-over between the logical subsectors 44 for recognizing individual channels cannot be realized using the conventional technique.

In the third preferred embodiment of the present invention, a procedure for hand-over processing is carried out under initiative control of the base station. At the time of changeover of the logical subsectors 44, the mobile terminal concerned is notified of spread code reassignment.

More specifically, for signal reception from each mobile terminal, a received signal intensity level of each channel in each logical subsector 44 is measured in advance at the base station. Then, between the received signal intensity level in the logical subsector 44 being connected currently and that in another logical subsector 44, comparison is made in terms of time average. If the latter is higher than the former, the spread code is changed using the means for spread code reassignment described in the first preferred embodiment. In comparison of the received signal intensity levels between logical subsectors 44, if a different logical subsector 44 is identified, it means that a different physical subsector 45 is used. Hence, an intensity level of a signal received by the sector antenna is measured. In this arrangement, a hand-over between logical subsectors 44 can be carried out seamlessly.

In the above-mentioned arrangement, it is necessary to give consideration to movement of each mobile terminal between the physical subsectors 45. When the mobile terminal is moved between the physical subsectors 45, there is a possibility of a significant change in propagation path condition. Since the mobile terminal cannot detect a changeover of the physical subsectors 45, there will occur a condition equivalent to an abrupt change in channel signaling. On occurrence of such a condition, a code error rate increases abruptly, which may cause a communication-disabled state. To prevent this, it is required to slowly decrease a transmission power level in the physical subsector 45 being used currently and to slowly increase a transmission power level in the physical subsector 45 to be used next. That is, the above problem can be circumvented by taking a period of approximately one second for switching the physical subsectors 45.

The description of the third preferred embodiment which has been given so far is based on the assumption that a region of each logical subsector 44 is invariable. In a situation where the number of codes to be assigned becomes insufficient due to an increase in communication traffic in the logical subsector 44 concerned, the region of the logical subsector 44 may be made smaller. Thus, it is possible to obviate a problem of insufficiency in the number of codes to be assigned.

Figure 5A:
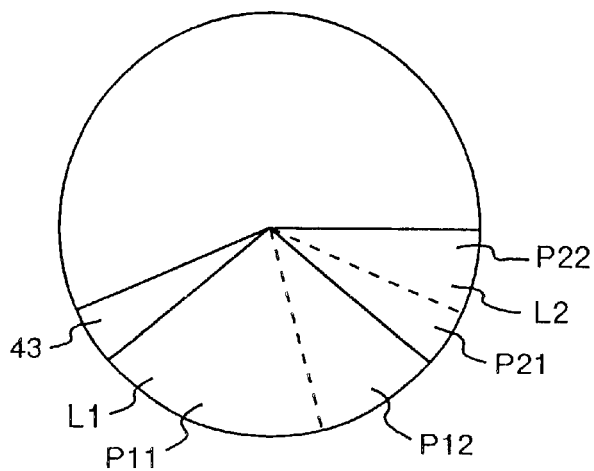
FIG. 5 is a diagrammatic illustration for explanation of code assignment for logical subsectors.

In the above case, if an extra number of codes are available in an adjacent logical subsector 44, a physical subsector 45 in juxtaposition therewith is so rearranged that it belongs to the adjacent logical subsector 44. Thus, a part of communication traffic can be left to the adjacent logical subsector 44. For example, as shown in FIG. 5(a), it is herein assumed that physical subsectors P11 and P12 belong to a logical subsector L1 and that physical subsectors P21 and P22 belong to a logical subsector L2.

Figure 5B:
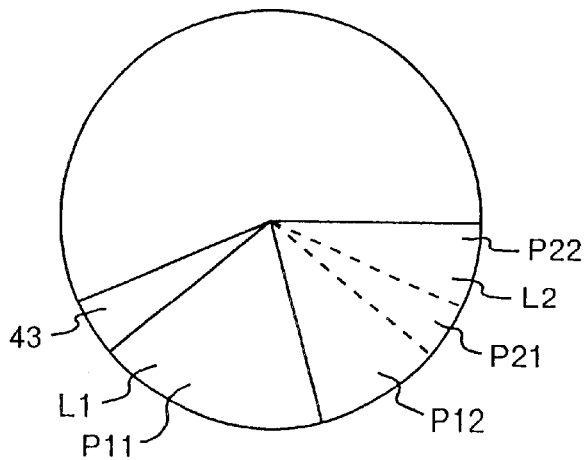

As an increase in the number of connections in the physical subsector P12, the number of codes therein may become insufficient. In this case, if an extra number of codes are available in the logical subsector L2, the physical subsector P12 is so rearranged that it belongs to the logical subsector L2 as shown in FIG. 5(b). Thus, in the physical subsector P12, a long code assigned to the logical subsector L2 is used.

If an extra number of codes are not available in the adjacent logical subsector 44, a new logical subsector is formed and a new long code is assigned thereto. Thus, the size of each logical subsector can be adjusted according to the amount of communication traffic.

Figure 5C:
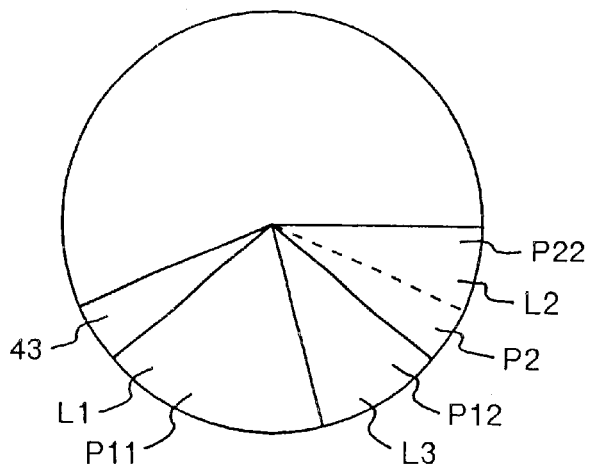

As exemplified above, when the number of connections in the physical subsector P12 increases, the number of codes therein may become insufficient. In this case, if an extra number of codes are not available in the logical subsector L2, a new logical subsector L3 is formed as shown in FIG. 5(c). Thus, communication with each mobile terminal located in the new logical subsector L3 is carried out using a new long code assigned for spread coding.

As aforementioned, the third preferred embodiment has been described using the example of the sector antenna system. In the sector antenna system, an area covered by the directivity of each sector antenna has been referred to as the physical subsector 45. This principle is also applicable to a case where adaptive array antennas are employed.

Essentially, common control channels are broadcast over a wide range (corresponding to the sector 43), and individual channels are handled using a narrow beam (corresponding to the logical subsector 44), thereby making it possible to circumvent frequent occurrences of hand-over processing. Further, the hand-over processing is carried out under initiative control of the base station instead of initiative control of each mobile terminal, thus making it possible to provide an improvement in communication capacity in the use of a narrow beam.

Embodiment 4

Figure 6:
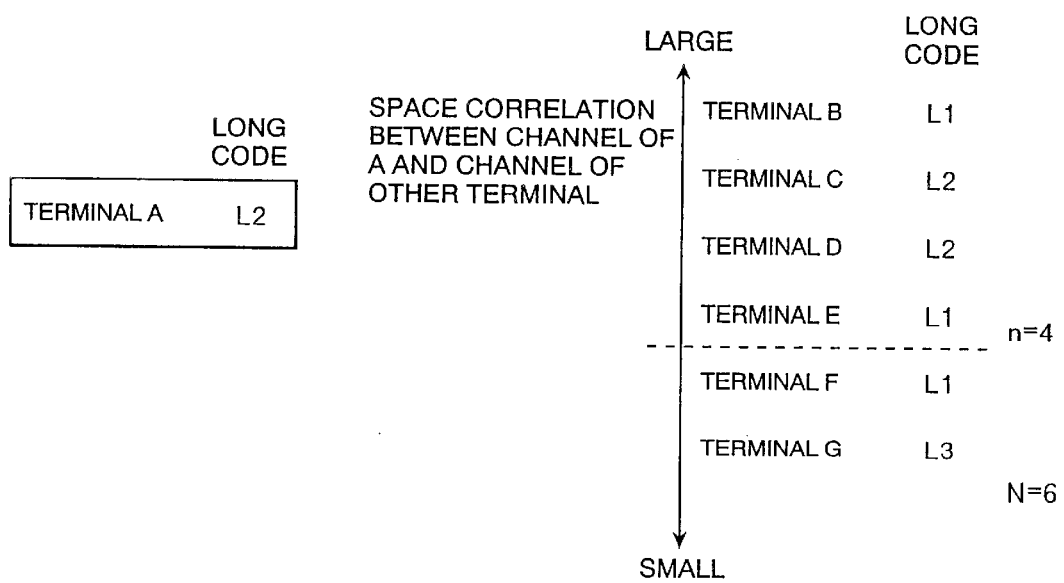
FIG. 6 is a diagrammatic illustration showing the results of mobile terminal sorting in descending order of space correlation values with respect to a terminal A.
Figure 7:
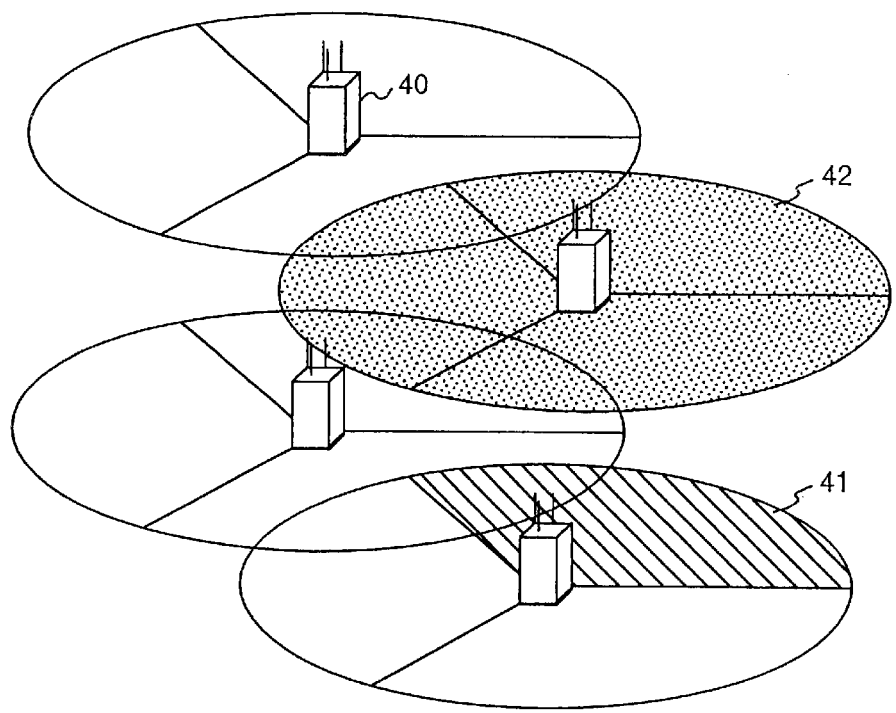
FIG. 7 is a diagrammatic illustration for explanation of multi-sector system in cellular radio communication.
Figure 8:
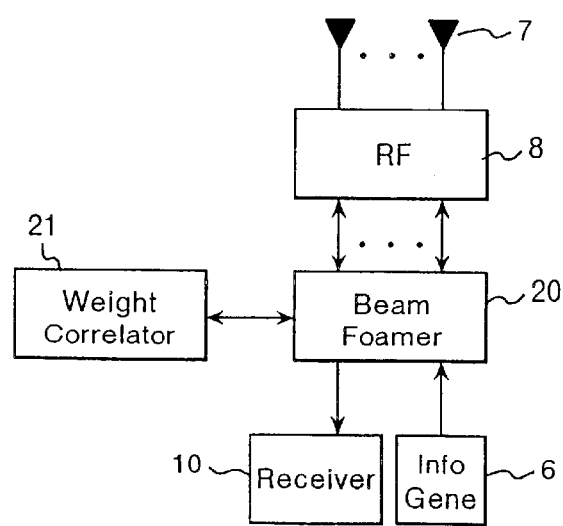
FIG. 8 is a block diagram of a base station in a communication system employing adaptive array antennas.

The following describes a fourth preferred embodiment of the present invention with particular reference to FIG. 6.

FIG. 6 is a diagrammatic illustration showing the results of mobile terminal sorting in descending order of space correlation values with respect to a terminal A.

In the description of the third preferred embodiment, the implementation of CDMA communication according to the present invention has been explained using the model of the sector antenna system in which each cell is divided into sectors corresponding to the directivity of each sector antenna. In the fourth preferred embodiment of the present invention, CDMA communication using dynamic code assignment is implemented by utilizing characteristics of adaptive array antennas.

Described below are the principle and concept of an adaptive array antenna system for CDMA communication using dynamic code assignment.

As mentioned in the foregoing, an adaptive array antenna has a feature that it can vary directivity through the use of electrical circuits, i.e., the adaptive array antenna is capable of reducing interference between spatially distant mobile terminals. Note, however, that due to a limitation on a degree of freedom, the adaptive array antenna does not suppress interference for mobile terminals located in the same bearing with respect to a base station. On the other hand, in the technique of reducing interference based on channel correlation using code orthogonality, the functionality of interference suppression has also constraint due to a limited number of short codes.

The purpose of the fourth preferred embodiment is to reduce communication interference as a whole by properly combining advantageous features of these techniques stated above. More specifically, in reduction of interference between mobile terminals by means of the adaptive array antenna, there is a limitation in connection with locations of the mobile terminals, whereas interference between spread codes is not related to locations of the mobile terminals. On the other hand, spatial channel correlation in use of the adaptive array antenna cannot be controlled at the base station since external environmental conditions such as propagation, antenna topology and angle diversity are involved therein, whereas interference between spread codes can be controlled at the base station since it is related to spread code assignment.

Therefore, in the third preferred embodiment, a determination which mobile terminal is to be subjected to interference reduction is formed according to a degree of space correlation, and a procedure for actual reduction of interference is carried out by dynamically changing a code assigned for communication with each mobile terminal. Thus, communication between the base station and each mobile terminal can be performed in consideration of both space and code correlations for interference reduction.

With reference to FIG. 6, the following explains a concrete procedure in the third preferred embodiment.

First, a degree of inter-channel space correlation used for communication with each mobile terminal is calculated. As described in Item (IV) of Embodiment 1, the inner product of weight values of the adaptive array antenna between channels is calculated using expression 4.

Then, with respect to a certain terminal, other terminals are sorted in descending order of channel space correlation values. In the example shown in FIG. 6, the total number of mobile terminals N is "7" and a terminal of interest is "A". In this example, it is assumed that the mobile terminals have been sorted as shown in FIG. 6.

Then, a long code for spread coding in channel communication of each mobile terminal is checked (hereinafter referred to simply as a "terminal long code"). The terminal long codes shown in FIG. 6 are given for example.

A predetermined number of terminal long codes "n" in the results of sorting are compared with the long code of the mobile terminal A of interest. Then, if any terminal long code is different from that of the mobile terminal A, the terminal long code is changed to that of the mobile terminal A.

In this example, the predetermined number of terminal long codes "n", i.e., a high-order range "n" in space correlation values arranged in descending order is "4". Since the long code used for channel communication with the mobile terminal A is L2, comparison with terminals B, C, D and E indicates that the long codes of the terminals B and E are different from the long code of the terminal A. Therefore, in this case, the long codes of the terminals B and E are changed to L2.

Thus, the same long code as that of the terminal A is used for channel communication with any terminals having a large degree of space correlation with respect to the terminal A, thereby making it possible to reduce a degree of code correlation. Since a time-space correlation value is the product of space and code correlations as represented by expression 1, a degree of time-space correlation can be decreased resultantly, thus allowing communication with less interference as a whole.

Embodiment 5

The following describes a fifth preferred embodiment of the present invention.

As described in the foregoing preferred embodiments, correlation calculation is made on transmission channels and a spread code is so reassigned as to minimize the result of correlation calculation in CDMA communication according to the present invention.

As to space correlation of channels, the inner product of weight values (expression 3) is applicable to the adaptive array antenna and the directivity characteristic correlation (expression 4) is applicable to the sector antenna as described in the foregoing.

In general, however, the weight values of the adaptive array antenna and the directivity characteristics of the sector antenna are related to the bearing of each mobile terminal as viewed from the base station. Therefore, if information on the bearing of each mobile terminal can be attained, it is applicable as an index for figuring out a degree of space correlation of channels.

In regard to bearing information for a system using adaptive array antennas, there are conventional techniques such as ESPRIT (Estimation if Signal Parameters via Rotational Invariance Techniques) and MUSIC (MUltimple SIgnal Classification). Using these techniques, bearing information can be calculated. For a mobile terminal which has been found to have a near level of bearing through calculation of bearing information, the same long code is assigned since it is determined that a degree of channel (propagation path) correlation is close. The ESPRIT and MUSIC are acronyms of algorithms formulated for estimating a signal arrival bearing in an adaptive array antenna.

In a system using sector antennas, each sector antenna is applicable for representation of bearing information. In a range of the same antenna or an adjacent antenna, it is postulated that a degree of space correlation is rather large to cause interference to an appreciable extent. Based on this postulation, a channel code of any mobile terminal located in the sector concerned is subjected to reassignment. Then, as described in the foregoing, code correlation calculation is performed and a spread code is changed for a large degree of correlation. Thus, in the sector antenna system, spread code reassignment can be carried out efficiently to minimize interference in communication in which a degree of space correlation is anticipated to increase.

Advantageous Effects of the Invention

As set forth hereinabove and according to the present invention, there is provided a code division multiple access communication method using dynamic code assignment, wherein an optimum spread code for minimizing inter-channel interference is used according to conditions of communication between a base station and a mobile terminal, and wherein code assignment is dynamically changed for a mobile terminal being in communication through detection of a timing point of code change under initiative control of the base station.

Further, in the code division multiple access communication method using dynamic code assignment according to the present invention, code assignment is dynamically changed to reduce inter-channel interference according to conditions such as space correlation and code correlation due to characteristics of adaptive array antennas or sector antennas employed for communication.

Still further, in the code division multiple access A0 communication method using dynamic code assignment according to the present invention, a hand-over procedure is carried out under initiative control of a base station for reducing power consumption of a mobile terminal so as to prolong a charge-to-charge service life of a battery contained therein. In addition, according to the present invention, there is provided a mobile communication system comprising a base station control unit connected with a base station, wherein code assignment is dynamically changed without making reference to a network for reducing a networking load in communication between the base station and the base station control unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A code division multiple access communication method using dynamic code assignment in radio communication based on code division multiple access between a base station having an array antenna and a mobile terminals, said code division multiple access communication method comprising:

providing an arrangement wherein, under condition that said base station performs communication with a plurality of mobile terminals using one set or a plurality of sets of spread codes, said base station assigns a spread code to be used by a mobile terminal, and notifies said mobile terminal of said spread code to be used, wherein said spread code to be used is selected based on a space correlation calculated using array weight value of said array antenna for communicating with said mobile terminal, and a code correlation with channels for other mobile terminals.

2. A code division multiple access communication method using dynamic code assignment according to claim 1, wherein said base station determines to reassign the spread code to be used for said mobile terminal while said base station and said mobile terminal are in communication, and at the time of notification of spread code reassignment from said base station to said mobile terminal of a timing point of spread code reassignment.

3. A code division multiple access communication method using dynamic code assignment according to claim 1, wherein said base station determines to reassign the spread code to be used for said mobile terminal while said base station and said mobile terminal are in communication, and, at the time of spread code reassignment, a transmission signal spread using a currently assigned spread code and a transmission signal spread using a new spread code to be assigned are sent in parallel, and then when said base station receives an acknowledgment that said mobile terminal has received the transmission signal spread using the new code to be assigned, said base station stops output of the transmission signal spread using the currently assigned spread code and sends only the transmission signal spread using the new spread code.

4. A code division multiple access communication method using dynamic code assignment according to claim 1, wherein a spread code is formed of the bitwise product or exclusive-OR result of long and short codes, and a set of spread codes or a group of spread codes based on a same long code, and wherein said base station determines to reassign the spread code when the number of short codes to be used for spread coding becomes insufficient.

5. A code division multiple access communication method using dynamic code assignment according to claim 4, wherein said base station is provided with a plurality of directional antennas capable of radiating radio waves in a limited direction, wherein a region covered by each directional antenna is defined as a physical subsector, a plurality of adjacent physical subsectors are grouped into a wider region in which the same long code is used for communication with communicating parties therein, and the wider region thus formed is defined as a logical subsector, and wherein, at the time of signal reception from each communicating party, under condition that a timewise average value of received signal intensity in an adjacent logical subsector becomes higher than that in a logical subsector currently engaged for communication with said communicating party; or under condition that, at said base station, a space correlation of a plurality of mobile terminal channels and a code correlation of a plurality of spread codes used for communication are calculated, each time-space correlation is determined according to the product of space and code correlations, and a value of time-space correlation attained using a long code for an adjacent logical subsector is found to be smaller than that attained using a long code for a logical subsector currently engaged for communication;

a procedure for spread code reassignment is carried out to perform communication based on the long code for said logical subsector adjacent to said logical subsector currently engaged for communication.

6. A code division multiple access communication method using dynamic code assignment according to claim 4, wherein said base station is provided with a plurality of directional antennas capable of radiating radio waves in a limited direction, wherein a region covered by each directional antenna is defined as a physical subsector, a plurality of adjacent physical subsectors are grouped into a wider region in which the same long code is used for communication with communicating parties therein, and the wider region thus formed is defined as a logical subsector, and wherein, in a situation that the number of short codes becomes insufficient due to an increase in communication traffic in a logical subsector A, a procedure for spread code reassignment is carried out to change a spread code in the following fashion:

(1) if there are short codes available for assignment in a logical subsector B adjacent to said logical subsector A, a physical subsector P which belongs to said logical subsector A and which is positioned on a boundary between said logical subsector A and said logical subsector B is rearranged so that said physical subsector P belongs to said logical subsector B, whereby a long code of said logical subsector B is used for communication with a communicating party in said physical subsector P;

(2) alternatively, if there are no short codes available for assignment in said logical subsector B adjacent to said logical subsector A, a new logical subsector C is formed for said physical subsector P which belongs to said logical subsector A and which is positioned on the boundary between said logical subsector A and said logical subsector B, whereby a long code of said logical subsector C is used for communication with a communicating party in said physical subsector P.

7. A code division multiple access communication method using dynamic code, assignment according to claim 4, wherein said base station is provided with a plurality of adaptive array antennas, and wherein, under either of the following conditions (1) and (2), the inner product of array weight values is calculated with respect to each communicating party, and a procedure for spread code reassignment is carried out to change a spread code so that the same long code is used for communication with a group of mobile terminals having a high value of inner product:

(1) at said base station, a space correlation of a plurality of receiving-side channels and a code correlation of a plurality of spread codes used for communication are calculated, each time-space correlation is determined according to the product of space and code correlations, each sum of time-space correlations is calculated with respect to all the inter-channel combinations, and a candidate for a new spread code to be assigned is determined according to a minimum-sum time-space correlation for spread code reassignment to perform communication based on the new spread code;

(2) at said base station, an interference power level per call is measured, and when the measured interference level per call exceeds a predetermined threshold, a spread code for a channel corresponding to each call of interest is changed for spread code reassignment.

8. A code division multiple access communication method using dynamic code assignment according to claim 7, wherein a space correlation of a channel used for communication with a mobile terminal A and channels used for communication with other mobile terminals is determined, wherein, with respect to a high-order range "n" in terms of space correlation values arranged in descending order, where "n" is a predetermined positive integer, comparison is made between a long code in spread coding for said channel used for communication with said mobile terminal A and long codes in spread coding for channels corresponding to said high-order range "n", and wherein a procedure for spread code reassignment is carried out to change a spread code in a fashion that long codes used for communication with other mobile terminals corresponding to said high-order range "n" are made identical to said long code used for communication with said mobile terminal A if a mismatch is found therebetween.

9. A code division multiple access communication method using dynamic code assignment according to claim 1, wherein, at said base station, a space correlation of a plurality of channels for a plurality of mobile terminals and a code correlation of a plurality of spread codes used for communication are calculated, each time-space correlation is determined according to the product of space and code correlations, each sum of time-space correlations is calculated with respect to all the inter-channel combinations, a candidate for a spread code to be assigned is determined according to a minimum-sum time-space correlation and a procedure for spread code assignment is carried out to perform communication based on said spread code.

10. A code division multiple access communication method using dynamic code assignment according to claim 9, wherein, at the base station, an interference power level per channel is measured, and when the measured interference power level per channel exceeds a predetermined threshold, a procedure for spread code reassignment is carried out to change a spread code for a channel corresponding to each channel of interest.

11. A code division multiple access communication method using dynamic code assignment according to claim 1, wherein a base station control unit is connected with said base station, and wherein said base station determines to reassign the spread code to be used for said mobile terminal while said base station and said mobile terminal are in communication, and, in execution of a procedure for spread code reassignment, a transmission signal is subjected to puncturing at said base station, and information on spread code reassignment is inserted into a free bit space thus produced for transmission to said mobile terminal.

12. A base station for code division multiple access communication using dynamic code assignment in radio communication between said base station having an array antenna and mobile terminals said base station comprising:

means for communicating with plurality of mobile terminals using one set or a plurality of sets of spread codes and assigning a spread code to be used by a mobile terminal;

means for notifying said mobile terminal of said spread code to be used, wherein said spread code to be used is selected based on a space correlation calculated using array weight value of said array antenna for communicating with said mobile terminal, and a code correlation with channels for other mobile terminals; and means for using the spread code after said notification so as to reduce interference between a channel used for communication in progress and another channel.

13. A base station for code division multiple access communication using dynamic code assignment according to claim 12, wherein means for informing said mobile terminal of a timing point of spread code reassignment is included in addition to said means for notifying said mobile terminal that the spread code is to be changed.

14. A base station for code division multiple access communication using dynamic code assignment according to claim 12, said base station further comprising:

means for simultaneously sending a transmission signal spread using a currently assigned code and a transmission signal spread using a new code to be assigned at the time of spread code reassignment; and means for, upon receipt of an acknowledgment that said mobile terminal has received the transmission signal spread using the new code to be assigned, stopping output of the transmission signal spread using the currently assigned code and for sending only the transmission signal spread using the new code.

15. A base station for code division multiple access communication using dynamic code assignment according the claim 12, wherein a spread code is formed of the bitwise product or exclusive-OR result of long and short codes, and a set of spread codes or a group of spread codes based on a same long code, and wherein there is provided means for reassigning the spread code when the number of short codes to be used for spread coding becomes insufficient.

16. A base station for code division multiple access communication using dynamic code assignment according to claim 12, said base station further comprising:

means for calculating a space correlation of a plurality of mobile terminal channels and a code correlation of a plurality of spread codes used for communications;

means for determining each time-space correlation according to the product of space and code correlations; and means for performing summation on time-space correlations with respect to all the inter-channel combinations;

wherein a candidate for a new spread code to be assigned is determined according to a minimum-sum time-space correlation, and a procedure for spread code reassignment is carried out to perform communication based on the new spread code.

17. A base station for code division multiple access communication using dynamic code assignment according to claim 16, said base station further comprising:

means for measuring an interference power level per channel, wherein, when the measured interference power level per channel exceeds a predetermined threshold, a procedure for spread code reassignment is carried out to change a spread code for a channel corresponding to each channel of interest.

18. A base station for code division multiple access communication using dynamic code assignment according to claim 12, wherein a base station control unit is connected with said base station, and wherein, said base station determines to reassign the spread code to be used for said mobile terminal while said base station and said mobile terminal are in communication and in execution of a procedure for spread code reassignment, a transmission signal received by said base station from said base station control unit is subjected to puncturing at said base station, and information on spread code reassignment is inserted into a free bit space thus produced to transmission to said mobile terminal.

19. A base station for code division multiple access communication using dynamic code assignment according to claim 12, wherein a spread code is formed of the bitwise product or exclusive-OR result of long and short codes, wherein there is provided means for detecting a bearing of each mobile terminal according to average received signal intensity, and wherein said mobile terminal is notified of spread code reassignment using said means for notification of spread code reassignment, and then a spread code for communication is changed in a fashion that long codes of a mobile terminal group located in the vicinity of the detected bearing are made identical.

20. A base station for code division multiple access communication using dynamic code assignment in radio communication between said base station and a mobile terminal, wherein a base station control unit is connected with said base station, and wherein, said base station determines to transmit control information to be used for said mobile terminal while said base station and said mobile terminal are in communication, and at the time of transmission of said control information to said mobile terminal, a transmission signal received by said base station from said base station control unit is subjected to puncturing at said base station, and said control information is inserted into a free bit space thus produced for transmission to said mobile.

21. A mobile terminal for code division multiple access communication using dynamic code assignment in radio communication between a base station and said mobile terminal, wherein a base station control unit is connected with said base station, wherein, said base station determines to transmit control information to be used for said mobile terminal while said base station and said mobile terminal are in communication, and at the time of transmission of said control information to said mobile terminal, a transmission signal received by said base station from said base station control unit is subjected to puncturing at said base station, and said control information is inserted into a free bit space thus produced for transmission to said mobile station, and wherein said mobile terminal is so arranged as to take the control information out of the transmission signal received from said base station.

* * * * *